United States Patent
Zhou et al.

(10) Patent No.: US 12,495,158 B2
(45) Date of Patent: Dec. 9, 2025

(54) INTER-FRAME PREDICTION METHOD, DEVICE, AND READABLE STORAGE MEDIUM

(71) Applicant: VIVO MOBILE COMMUNICATION CO., LTD., Dongguan (CN)

(72) Inventors: Chuan Zhou, Dongguan (CN); Zhuoyi Lv, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 48 days.

(21) Appl. No.: 18/764,354

(22) Filed: Jul. 4, 2024

(65) Prior Publication Data
US 2024/0364918 A1   Oct. 31, 2024

Related U.S. Application Data

(63) Continuation of application No. PCT/CN2022/143329, filed on Dec. 29, 2022.

(30) Foreign Application Priority Data

Jan. 5, 2022 (CN) .......................... 202210007063.4
Apr. 11, 2022 (CN) .......................... 202210374666.8

(51) Int. Cl.
*H04N 19/513* (2014.01)
(52) U.S. Cl.
CPC ................................ *H04N 19/521* (2014.11)
(58) Field of Classification Search
CPC .. H04N 19/521; H04N 19/105; H04N 19/174; H04N 19/51; H04N 19/52
(Continued)

(56) References Cited

U.S. PATENT DOCUMENTS

2014/0355686 A1\* 12/2014 Takehara ............. H04N 19/503
375/240.16
2020/0084441 A1\* 3/2020 Lee ...................... H04N 19/139
(Continued)

FOREIGN PATENT DOCUMENTS

| CN | 110248188 A | 9/2019 |
| CN | 111010565 A | 4/2020 |

(Continued)

OTHER PUBLICATIONS

First Office Action issued in related Chinese Application No. 202210374666.8, mailed Jun. 4, 2025, 5 pages.
(Continued)

*Primary Examiner* — Tung T Vo
(74) *Attorney, Agent, or Firm* — IPX PLLC

(57) ABSTRACT

An inter-frame prediction method, a device, and a readable storage medium are provided. The method includes: determining a plurality of motion vector prediction candidates from a motion vector prediction candidate list of a target codec unit according to a template; performing offset processing on the plurality of motion vector prediction candidates to obtain a plurality of offset motion vector prediction candidates; determining a target motion vector prediction candidate according to the plurality of offset motion vector prediction candidates; and using the target motion vector prediction candidate as a search start point to obtain a target motion vector prediction through template matching, where the plurality of motion vector prediction candidates are a plurality of motion vector prediction candidates whose error between a current template and a reference template in the motion vector prediction candidate list is ranked in a first preset position.

18 Claims, 2 Drawing Sheets

(58) Field of Classification Search
USPC .................................................. 375/240.16
See application file for complete search history.

(56) References Cited

U.S. PATENT DOCUMENTS

| | | | |
|---|---|---|---|
| 2020/0413040 A1* | 12/2020 | Lim ..................... | H04N 19/137 |
| 2021/0084329 A1 | 3/2021 | Venugopal et al. | |
| 2021/0211705 A1 | 7/2021 | Lee | |
| 2022/0060690 A1* | 2/2022 | Sethuraman ......... | H04N 19/513 |
| 2023/0199178 A1* | 6/2023 | Jiang ................... | H04N 19/159 |
| | | | 375/240.13 |
| 2024/0015300 A1* | 1/2024 | Kim ...................... | H04N 19/52 |
| 2024/0386662 A1* | 11/2024 | Huang .................. | G06V 10/82 |

FOREIGN PATENT DOCUMENTS

| | | |
|---|---|---|
| CN | 112449197 A | 3/2021 |
| CN | 113596475 A | 11/2021 |

OTHER PUBLICATIONS

Chuan Zhou et al., Non-EE2: MVP refinement for regular AMVP mode, JVET-Y0091-v2, Jan. 2022, 4 pages.
International Search Report and Written Opinion issued in corresponding International Application No. PCT/CN2022/143329 mailed Mar. 14, 2023, 7 pages.

\* cited by examiner

ND READABLE STORAGE
INTER-FRAME PREDICTION METHOD, DEVICE, AND READABLE STORAGE MEDIUM

CROSS-REFERENCE TO RELATED APPLICATIONS

This application is a continuation of International Application No. PCT/CN2022/143329, filed on Dec. 29, 2022, which claims priority to Chinese Patent Application No. 202210007063.4, filed Jan. 5, 2022, and to Chinese Patent Application No. 202210374666.8, filed on Apr. 11, 2022. The entire contents of each of the above-identified applications are expressly incorporated herein by reference.

TECHNICAL FIELD

This application pertains to the field of communication technologies, and specifically relates to an inter-frame prediction method, a device, and a readable storage medium.

BACKGROUND

Inter-frame prediction utilizes a correlation of video times to remove a video time domain redundancy. Since a video sequence typically includes a strong time domain correlation, many residual values are close to zero. A residual signal is used as an input of a subsequent module for transformation, quantization, scanning and entropy coding, so that the video signal can be efficiently compressed. For an inter-frame prediction block, a motion parameter includes a motion vector, a reference image index, a reference image list index, and the like.

After a motion vector prediction candidate list is constructed in a current inter-frame prediction method, a motion vector prediction candidate with a minimum error between a current template and a reference template is selected based on a template, and then template matching is performed only on the motion vector prediction candidate. Consequently, prediction accuracy is insufficient.

SUMMARY

Embodiments of this application provide an inter-frame prediction method, a device, and a readable storage medium.

According to a first aspect, an inter-frame prediction method is provided, including:
  determining a plurality of motion vector prediction candidates from a motion vector prediction candidate list of a target codec unit according to a template;
  performing offset processing on the plurality of motion vector prediction candidates to obtain a plurality of offset motion vector prediction candidates;
  determining a target motion vector prediction candidate according to the plurality of offset motion vector prediction candidates; and
  using the target motion vector prediction candidate as a search start point to obtain a target motion vector prediction through template matching, where
  the plurality of motion vector prediction candidates are a plurality of motion vector prediction candidates whose error between a current template and a reference template in the motion vector prediction candidate list is ranked in a first preset position.

According to a second aspect, an inter-frame prediction apparatus is provided, including:
  a first determining module, configured to determine a plurality of motion vector prediction candidates from a motion vector prediction candidate list of a target codec unit according to a template;
  an offset module, configured to perform offset processing on the plurality of motion vector prediction candidates to obtain a plurality of offset motion vector prediction candidates;
  a second determining module, configured to determine a target motion vector prediction candidate according to the plurality of offset motion vector prediction candidates; and
  a processing module, configured to use the target motion vector prediction candidate as a search start point to obtain a target motion vector prediction through template matching, where
  the plurality of motion vector prediction candidates are a plurality of motion vector prediction candidates whose error between a current template and a reference template in the motion vector prediction candidate list is ranked in a first preset position.

According to a third aspect, a terminal is provided, including a processor and a memory. The memory stores a program or an instruction that can be run on the processor, and the program or the instruction is executed by the processor to implement the steps of the inter-frame prediction method according to the first aspect.

According to a fourth aspect, a terminal is provided, including a processor and a communication interface. The processor is configured to: determine a plurality of motion vector prediction candidates from a motion vector prediction candidate list of a target codec unit according to a template;
  perform offset processing on the plurality of motion vector prediction candidates to obtain a plurality of offset motion vector prediction candidates;
  determine a target motion vector prediction candidate according to the plurality of offset motion vector prediction candidates; and
  use the target motion vector prediction candidate as a search start point to obtain a target motion vector prediction through template matching, where
  the plurality of motion vector prediction candidates are a plurality of motion vector prediction candidates whose error between a current template and a reference template in the motion vector prediction candidate list is ranked in a first preset position, and the target motion vector prediction candidate is a motion vector prediction candidate whose error between the current template and the reference template in the plurality of offset motion vector prediction candidates is ranked in a second preset position.

According to a fifth aspect, a readable storage medium is provided. The readable storage medium stores a program or an instruction, and the program or the instruction is executed by a processor to implement the steps of the method according to the first aspect.

According to a sixth aspect, a chip is provided. The chip includes a processor and a communication interface, the communication interface is coupled to the processor, and the processor is configured to run a program or an instruction to implement the method according to the first aspect.

According to a seventh aspect, a computer program/program product is provided. The computer program/program product is stored in a storage medium, and the com-

DETAILED DESCRIPTION

Figure 1:
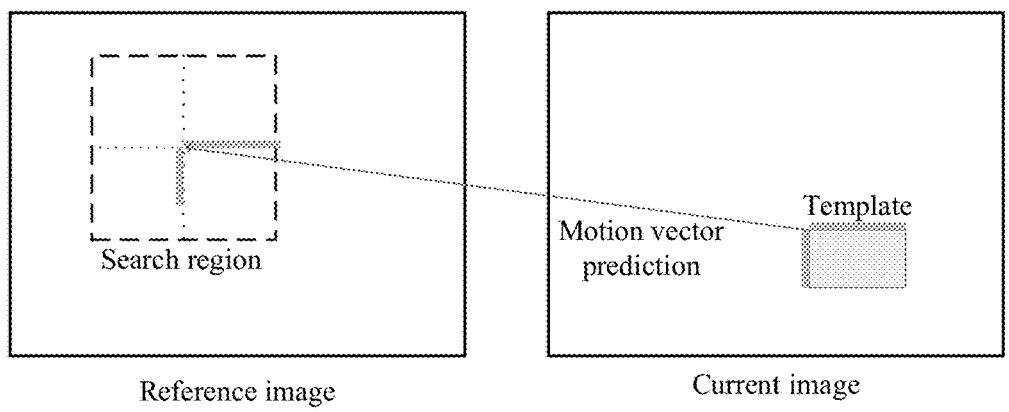
FIG. 1 is a schematic diagram of template matching processing according to an embodiment of this application.

The following describes the embodiments of this application with reference to the accompanying drawings in the embodiments of this application. Apparently, the described embodiments are some but not all of the embodiments of this application. All other embodiments obtained by a person of ordinary skill based on the embodiments of this application shall fall within the protection scope of this application.

In the specification and claims of this application, the terms "first," "second," and the like are intended to distinguish between similar objects but do not describe a specific order or sequence. It should be understood that the terms used in such a way are interchangeable in proper circumstances so that the embodiments of this application can be implemented in orders other than the order illustrated or described herein. Objects classified by "first" and "second" are usually of a same type, and the number of objects is not limited. For example, there may be one or more first objects. In addition, in the specification and claims, "and/or" represents at least one of connected objects, and a character "/" generally represents an "or" relationship between associated objects.

To better understand the technical solutions in the embodiments of this application, the following content is first described:

In a Versatile Video Coding (VVC) standard, an image is divided into a series of coding tree units, and the coding tree units are further divided into decoding units by using a plurality of types of tree structures. A prediction sample of the decoding unit is obtained through intra-frame prediction or inter-frame prediction. An original sample and a prediction sample of a code block are subtracted to obtain a residual sample, and the residual sample is transformed and quantized to obtain residual information. After entropy coding, the residual information is written into a bitstream.

A decoder obtains prediction information of a current to-be-decoded decoding unit from the bitstream, and derives a prediction sample by using the prediction information. The residual information is obtained from the bitstream, and inverse quantization and inverse transformation are performed to obtain the residual sample, and the residual sample is added to the prediction sample to obtain a reconstruction sample of the current to-be-decoded decoding unit.

Advanced Motion Vector Prediction (AMVP)

Advanced motion vector prediction is an inter-frame prediction technology in which spatial and temporal correlations between motion vectors of current and adjacent blocks are used to save the number of bits required to code a motion vector. In the VVC standard, there are two advanced motion vector prediction modes: a conventional advanced motion vector prediction mode and an affine advanced motion vector prediction mode.

In the conventional advanced motion vector prediction mode, a motion vector prediction candidate list is constructed by using the following five types of candidate sequences:
  (1) a spatial motion vector prediction of an adjacent block in spatial domain;
  (2) a time domain motion vector prediction of a block at a same position in time domain;
  (3) a historical motion vector-based motion vector prediction;
  (4) a pair-averaged motion vector prediction; and
  (5) a zero motion vector.

In the affine advanced motion vector prediction mode, a motion vector prediction candidate list is constructed by using the following four types of candidate sequences:
  (1) an inherited affine motion vector prediction candidate is inferred from a control point motion vector of an adjacent block;
  (2) an affine motion vector prediction candidate is constructed by using a translation motion vector of the adjacent block;
  (3) the translation motion vector from the adjacent block; and
  (4) a zero motion vector.

Template Matching

Template matching is a motion vector derivation method at a decoding end introduced in a next-generation standard exploration experiment. As shown in FIG. 1, an optimal matching block (a template of the same size) is found in a region of a reference image by using a template of a current image (a few adjacent rows or columns on the upper or a left side of a current block), so that motion information of the current block can be optimized.

In the conventional advanced motion vector prediction mode, after a motion vector prediction candidate list is constructed, a motion vector prediction candidate with a minimum error between a current template and a reference template is selected based on a template, and then template matching is performed on only this motion vector prediction candidate. The error described herein is Sum of Absolute Transformed Difference (SATD) between the current template and the reference template of a reconstruction sample, or may be another error calculation method. The current module is a template corresponding to a current codec unit, and a decoding unit corresponds to a Coding Unit (CU).

Adaptive Motion Vector Resolution (AMVR)

The adaptive motion vector resolution allows a motion vector difference (a difference between a motion vector and a motion vector prediction) to be coded with different resolutions, thus saving the number of bits required for coding the motion vector difference. In a conventional motion vector prediction mode, resolutions of the motion vector difference may be ¼ pixel, ½ pixel, 1 pixel, and 4 pixels. In an affine advanced motion vector prediction mode, resolutions of the motion vector difference may be ¼ pixel, 1 pixel, and 1/16 pixel.

With reference to the accompanying drawings, the following describes in detail an inter-frame prediction method provided in the embodiments of this application by using some embodiments and application scenarios thereof.

Figure 2:
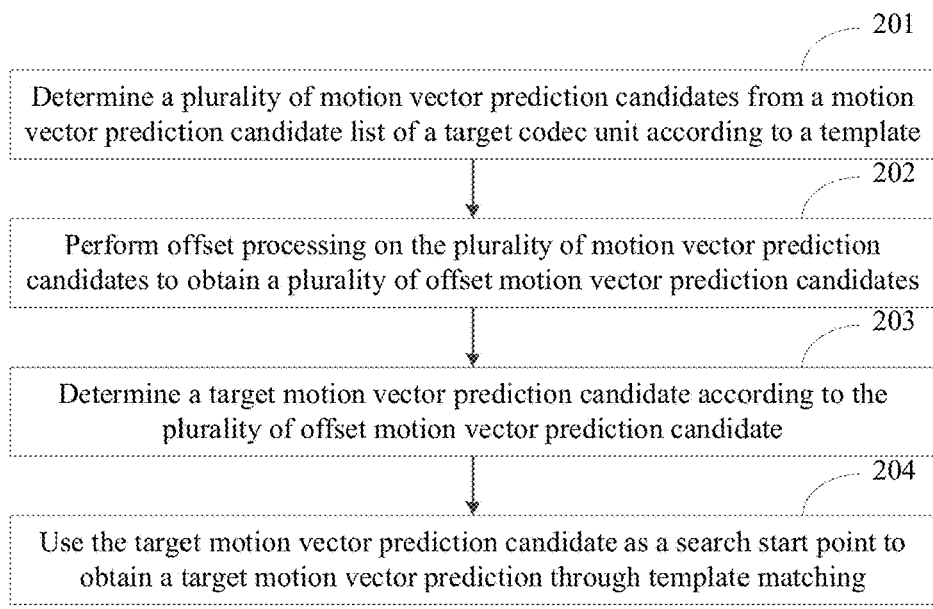
FIG. 2 is a flowchart of an inter-frame prediction method according to an embodiment of this application.

Referring to FIG. 2, an embodiment of this application provides an inter-frame prediction method. The method may be performed by a terminal or a control module that is in the terminal and that is configured to perform a terminal operation, including:

Step 201: Determine a plurality of motion vector prediction candidates from a motion vector prediction candidate list of a target codec unit according to a template.

It should be noted that, in the foregoing step 201, the motion vector prediction candidate list may be constructed in an existing manner of constructing a motion vector prediction candidate list. For a motion vector prediction candidate, different from an existing manner, in this application, a plurality of motion vector prediction candidates (which may be denoted as CandMv) with a minimum error between a current template and a reference template are selected from the motion vector prediction candidate list, rather than just one.

Step 202: Perform offset processing on the plurality of motion vector prediction candidates to obtain a plurality of offset motion vector prediction candidates.

Step 203: Determine a target motion vector prediction candidate according to the plurality of offset motion vector prediction candidates.

Step 204: Use the target motion vector prediction candidate as a search start point to obtain a target motion vector prediction through template matching.

It should be noted that, in the foregoing step 204, the target motion vector prediction may be obtained in an existing template matching manner. This process is not specifically limited in this embodiment of this application.

The plurality of motion vector prediction candidates are a plurality of motion vector prediction candidates whose error between a current template and a reference template in the motion vector prediction candidate list is ranked in a first preset position.

The first preset position may be last N positions, that is, N positions with a minimum error, or may be a penultimate position or an antepenultimate position, that is, no last position.

In an implementation, the first preset position is N positions with a minimum error between the current template and the reference template in the motion vector prediction candidate list, where N is an integer greater than or equal to 1.

In some implementations, two motion vector prediction candidates (denoted as CandMv0 and CandMv1) with a minimum error may be selected from the motion vector prediction candidate list, or three or four motion vector prediction candidates or the like may be selected. This is not specifically limited in this embodiment of this application. For ease of description, an example in which two motion vector prediction candidates (CandMv0 and CandMv1) with a minimum error are selected is used for description in subsequent embodiments.

It should be noted that, in this embodiment of this application, the reference template is specifically a template after offset processing for an offset motion vector prediction candidate, and the reference template is specifically a template before offset processing for a motion vector prediction candidate.

It should be noted that, in this embodiment of this application, a manner of obtaining a plurality of motion vector prediction candidates with a minimum error may be: comparing each error with a current error; and if the error is less than the current error, replacing the error with the current error, and so on.

In the embodiments of this application, a plurality of motion vector prediction candidates whose error between a current template and a reference template is ranked in a preset position are selected from a motion vector prediction candidate list of a target codec unit based on a template; then offset processing and screening are performed on the plurality of motion vector prediction candidates to obtain an optimal target motion vector prediction candidate; and finally, a target motion vector prediction is obtained based on the target motion vector prediction candidate through template matching, so that a more accurate motion vector prediction can be obtained by using the method in the embodiments of this application.

In an implementation, the performing offset processing on the plurality of motion vector prediction candidates to obtain a plurality of offset motion vector prediction candidates includes:

performing offset processing on each of the plurality of motion vector prediction candidates along each of at least one preset direction according to a first preset offset distance, to obtain a plurality of first offset motion vector prediction candidates; and.

In this embodiment of this application, the first preset offset distance may include one or more preset offset distances. For example, a plurality of preset directions and a plurality of preset offset distances are preset. In a specific offset processing process, for each motion vector prediction candidate, offset processing is successively performed according to each preset offset distance in each preset direction for many times, to obtain the plurality of offset motion vector prediction candidates.

For example, if two preset directions (a direction 1 and a direction 2) and three preset offset distances (a distance a, a distance b, and a distance c) are preset, and motion vector prediction candidates are CandMv0 and CandMv1, an offset processing process is as follows: Offset processing is separately performed on CandMv0 according to the distance a, the distance b, and the distance c in the direction 1 and the direction 2 for three times, and a different offset distance is based on each time, so that six offset motion vector prediction candidates are obtained. Similarly, offset processing is separately performed on CandMv1 according to the distance a, the distance b, and the distance c in the direction 1 and the direction 2 for three times, and a different offset distance is based on each time, so that six offset motion vector prediction candidates are obtained. In other words, a total of 12 offset motion vector prediction candidates are obtained.

In an implementation, the method further includes: determining a preset direction and a preset offset distance according to a value of a flag of a current to-be-decoded image header.

In this embodiment of this application, information about the preset direction and the preset offset distance may be set by using the value of the flag of the current to-be-decoded image header, where the flag may be ph_mmvd_fullpel_only_flag in a VVC standard, ph_gpm_mmvd_table_flag in a next-generation exploration experiment, or a new flag added to the image header.

Referring to Table 1, Table 1 shows setting of a preset offset distance:

TABLE 1

| distance_idx | Distance | |
| --- | --- | --- |
| | flag == 0 | flag == 1 |
| 0 | 1 | 0 |
| 1 | 2 | 1 |
| 2 | 4 | 2 |
| 3 | 8 | 3 |
| 4 | 16 | 4 |
| 5 | 32 | 5 |

TABLE 1-continued

| | Distance | |
|---|---|---|
| distance_idx | flag == 0 | flag == 1 |
| 6 | 64 | 6 |
| 7 | 128 | 7 |
| 8 | — | 64 |

It should be noted that, in Table 1, two groups of preset offset distances are specifically provided, and are separately identified by flag==0 and flag==1.

It can be understood that only one group of preset offset distances may be set. In this case, the preset offset distances do not need to be distinguished by a flag, which is specifically shown in Table 2:

TABLE 2

| distance_idx | Distance |
|---|---|
| 0 | 1 |
| 1 | 2 |
| 2 | 4 |
| 3 | 8 |
| 4 | 12 |
| 5 | 16 |
| 6 | 24 |
| 7 | 32 |
| 8 | 64 |

Referring to Table 3, Table 3 shows setting of a preset direction.

TABLE 3

| direction_idx | SignX | SignY |
|---|---|---|
| 0 | +1 | 0 |
| 1 | −1 | 0 |
| 2 | 0 | +1 |
| 3 | 0 | −1 |
| 4 | +1 | +1 |
| 5 | +1 | −1 |
| 6 | −1 | +1 |
| 7 | −1 | −1 |

It should be noted that, in Table 3, SignX may be understood as a direction of an X-axis in a conventional rectangular coordinate system. Correspondingly, a value+1 indicates a positive direction of the X-axis, and a value-1 indicates a negative direction of the X-axis. The same is true for SignY. Based on this, a preset direction corresponding to direction_idx=0 in Table 3 is a positive direction of an X-axis, a preset direction corresponding to direction_idx=4 in Table 3 is a direction of 45° pointing to a first quadrant, and a preset direction corresponding to direction_idx=6 in Table 3 is a direction of 45° pointing to a second quadrant. For another preset direction corresponding to direction_idx in Table 3, reference may be made based on a same principle, and details are not described herein again.

Further, offset calculation for a motion vector prediction candidate is as follows:

$$CandMvX = CandMvX + OffsetMvX;\text{ and}$$

$$CandMvY = CandMvY + OffsetMvY,\text{ where}$$

$$OffsetMvX = (Distance \ll 2) * SignX,$$

$$\text{and } OffsetMvY = (Distance \ll 2) * SignY.$$

In an implementation, the determining a target motion vector prediction candidate according to the plurality of offset motion vector prediction candidates includes:

determining the target motion vector prediction candidate from the plurality of first offset motion vector prediction candidates; or determining the target motion vector prediction candidate from the plurality of first offset motion vector prediction candidates and the plurality of motion vector prediction candidates.

In an implementation, the determining the target motion vector prediction candidate from the plurality of first offset motion vector prediction candidates includes:

(1) determining a first motion vector prediction candidate according to the plurality of first offset motion vector prediction candidates, where the first motion vector prediction candidate is a motion vector prediction candidate corresponding to a first offset motion vector prediction candidate whose error between the current template and the reference template is ranked in a second preset position.

The second preset position may be last M positions, that is, M positions with a minimum error.

In an implementation, the second preset position is M positions with a minimum error between the current template and the reference template, and M is an integer greater than or equal to 1, for example, may be the last position.

(2) Performing offset processing on the first motion vector prediction candidate along each of the at least one preset direction according to a second preset offset distance, to obtain a second offset motion vector prediction candidate, where there may be one or more second offset motion vector prediction candidates.

(3) Determining, from the second offset motion vector prediction candidate, the target motion vector prediction candidate whose error between the current template and the reference template is ranked in a third preset position; or determining, from the second offset motion vector prediction candidate and the first motion vector prediction candidate, the target motion vector prediction candidate whose error between the current template and the reference template is ranked in a third preset position.

The third preset position may be last X positions, that is, X positions with a minimum error.

In an implementation, the third preset position is X positions with a minimum error between the current template and the reference template, and X is an integer greater than or equal to 1, for example, may be the last position.

In an implementation, the first preset offset distance is less than a first threshold, and the second preset offset distance is greater than or equal to the first threshold.

In an implementation, an error corresponding to the first offset motion vector prediction candidate is less than an error corresponding to the first motion vector prediction candidate.

In an implementation, the determining the target motion vector prediction candidate from the plurality of first offset motion vector prediction candidates and the plurality of motion vector prediction candidates includes:

determining, from the plurality of first offset motion vector prediction candidates and the plurality of motion vector prediction candidates, the target motion vector prediction candidate whose error between the current template and the reference template is ranked in a fourth preset position.

The fourth preset position may be last Y positions, that is, Y positions with a minimum error.

In an implementation, the fourth preset position is Y positions with a minimum error between the current template and the reference template, and Y is an integer greater than or equal to 1, for example, may be the last position.

In this embodiment of this application, when offset processing is performed on the plurality of motion vector prediction candidates, screening is performed based on two preset offset distances:

First, offset processing is performed in a range of the first preset offset distance less than the first threshold, and then the first motion vector prediction candidate with a minimum first error is selected. For example, in a case that an offset distance is less than 4 (for example, the offset distance in the foregoing Table 1 is used as an example for description, and another distance value may be selected according to a specific case), offset processing is performed on CandMv0 and CandMv1, and an error between the current template and the reference template after offset processing is calculated, where a candidate corresponding to a minimum error in all errors is a motion vector candidate CandMv2.

Then, in a range of the second preset offset distance greater than or equal to the first threshold, offset processing is performed on the first motion vector prediction candidate, and an error between the current template and the reference template after offset processing is calculated, where a candidate corresponding to a minimum error in all errors is determined as an optimal motion vector prediction candidate, that is, the target motion vector prediction candidate. For example, in a case that an offset distance is greater than or equal to 4, offset processing is performed on CandMv2, and then tan error between the current template and the reference template after offset processing is calculated, where a candidate corresponding to a minimum error in all errors is the target motion vector prediction candidate.

In an implementation, the determining the target motion vector prediction candidate from the plurality of first offset motion vector prediction candidates includes:

(1) determining a first motion vector prediction candidate according to the plurality of first offset motion vector prediction candidates, where the first motion vector prediction candidate is a motion vector prediction candidate corresponding to a first offset motion vector prediction candidate with a minimum error between the current template and the reference template;

(2) determining whether the first motion vector prediction candidate is equal to any one of the plurality of motion vector prediction candidates; and if yes, performing (3); otherwise, performing (4);

(3) determining the first motion vector prediction candidate as the target motion vector prediction candidate;

(4) performing offset processing on the first motion vector prediction candidate along each of the at least one preset direction according to a second preset offset distance, to obtain a second offset motion vector prediction candidate, and then performing (5); and (5) determining, from the second offset motion vector prediction candidate, the target motion vector prediction candidate with a minimum error between the current template and the reference template; or determining, from the second offset motion vector prediction candidate and the first motion vector prediction candidate, the target motion vector prediction candidate with a minimum error between the current template and the reference template.

In this embodiment of this application, when offset processing is performed on the plurality of motion vector prediction candidates, screening is performed based on two preset offset distances:

First, offset processing is performed in a range of the preset offset distance less than the first threshold, and then the first motion vector prediction candidate with a minimum first error is selected. For example, in a case that an offset distance is less than 4 (for example, the offset distance in the foregoing Table 1 is used as an example for description, and another distance value may be selected according to a specific case), offset processing is performed on CandMv0 and CandMv1, and an error between the current template and the reference template after offset processing is calculated, where a candidate corresponding to a minimum error in all errors is a motion vector candidate CandMv2.

In this case, it is determined whether the first motion vector prediction candidate is equal to any one of the plurality of motion vector prediction candidates; and if yes, the first motion vector prediction candidate is directly determined as an optimal motion vector prediction candidate, that is, the target motion vector prediction candidate. For example, if it is determined that CandMv2 is equal to CandMv0 or CandMv1, CandMv2 is directly determined as the optimal motion vector prediction candidate, that is, the target motion vector prediction candidate.

Otherwise, in a range of the preset offset distance greater than or equal to the first threshold, offset processing is performed on the first motion vector prediction candidate, and an error between the current template and the reference template after offset processing is calculated, where a candidate corresponding to a minimum error in all errors is determined as an optimal motion vector prediction candidate, that is, the target motion vector prediction candidate. For example, in a case that an offset distance is greater than or equal to 4, offset processing is performed on CandMv2, and then tan error between the current template and the reference template after offset processing is calculated, where a candidate corresponding to a minimum error in all errors is the target motion vector prediction candidate.

In an implementation, the first preset offset distance is an offset distance included in a preset prediction offset distance set, the second preset offset distance is at least one offset distance associated with a target offset distance, and the target offset distance is a first preset offset distance corresponding to the first motion vector prediction candidate.

In this embodiment, the prediction offset distance set is preset, and the prediction offset distance set is used to represent a mapping relationship between an index and an offset distance. It should be understood that distance_idx in the foregoing Table 1 and Table 2 represents an index, Distance in the foregoing Table 1 and Table 2 represents an offset distance, and the prediction offset distance set may be set as mapping relationships between some indexes included in the foregoing Table 1 and Table 2 and offset distances. For example, the prediction offset distance set includes offset distances corresponding to all even indexes in Table 2. In this case, it can be learned through lookup of Table 2 that the first preset offset distance is 1, 4, 12, 24, and 64.

As described above, after two motion vector prediction candidates (CandMv0 and CandMv1) with a minimum error are selected, offset processing is performed on CandMv0 and CandMv1 according to the first preset offset distance, and an error between the current template and the reference template after offset processing is calculated, where a candidate corresponding to a minimum error in all errors is a motion vector candidate CandMv2. The first preset offset distance corresponding to CandMv2 is determined as the target offset distance.

In this embodiment, the second preset offset distance associated with the target offset distance may be determined through lookup of Table 1 and Table 2. For example, in a case that the target offset distance is 4, and an index corresponding to the target offset distance in Table 2 is 2, offset distances corresponding to indexes adjacent to the index 2 in Table 2 may be set to the second preset offset distance, that is, offset distances corresponding to an index 1 and an index 3 are set to the second preset offset distance, and the second preset offset distance is 2 and 8.

Offset processing is performed on CandMv2 according to the second preset offset distance, and then tan error between the current template and the reference template after offset processing is calculated, where a candidate corresponding to a minimum error in all errors is the target motion vector prediction candidate.

In an implementation, after the target offset distance is determined, it is determined whether the first motion vector prediction candidate is equal to any one of the plurality of motion vector prediction candidates, that is, it is determined whether CandMv2 is equal to CandMv0 or CandMv1, and if yes, CandMv2 is determined as the target motion vector prediction candidate; or if no, the foregoing step of performing offset processing on CandMv2 to determine the target motion vector prediction candidate is performed.

In this embodiment, the prediction offset distance set is preset, and offset processing is performed on a motion vector prediction candidate according to the first preset offset distance included in the prediction offset distance set. In addition, after the motion vector candidate is determined, offset processing is performed on the motion vector candidate by using the second preset offset distance, to determine the target motion vector prediction candidate. In the foregoing process, a quantity of times of performing offset processing on the motion vector prediction candidate and the motion vector candidate is reduced, thereby improving inter-frame prediction efficiency.

In an implementation, a motion vector resolution of each of the plurality of offset motion vector prediction candidates is equal to a motion vector resolution of the target codec unit.

It should be noted that, that the motion vector resolution of the offset motion vector prediction candidate is equal to the motion vector resolution of the target codec unit specifically means that the motion vector resolution of the offset motion vector prediction candidate is equal to the motion vector resolution of the target codec unit after rounding is performed on motion vector resolutions.

Specific rounding processing of a motion vector resolution is as follows:

If rightShift is equal to 0, offset is assigned to 0; otherwise, offset is assigned to (1<<(rightShift-1))-1.

$$Mv[0] = \text{Sign}(mvX[0]) * (((\text{Abs}(mvX[0]) + \text{offset}) \gg \text{rightShift}) \ll \text{leftShift});$$

and $$Mv[1] = \text{Sign}(mvX[1]) * (((\text{Abs}(mvX[1]) + \text{offset}) \gg \text{rightShift}) \ll \text{leftShift}).$$

Both the right shift value rightShift and the left shift value leftShift are equal to AmvrShift. AmvrShift may be obtained through lookup of Table 4:

TABLE 4

| | | AmvrShift | | |
|---|---|---|---|---|
| Adaptive motion vector flag | Adaptive motion vector resolution index | Inter-frame affine prediction mode | Intra-frame block copy prediction mode | Non-inter-frame affine prediction mode and non-intra-frame block copy prediction mode |
| 0 | — | 2 (¼ pixel) | — | 2 (¼ pixel) |
| 1 | 0 | 0 (¹⁄₁₆ pixels) | 4 (1 pixel) | 3 (½ pixel) |
| 1 | 1 | 4 (1 pixel) | 6 (4 pixels) | 4 (1 pixel) |
| 1 | 2 | — | — | 6 (4 pixels) |

In an implementation, a motion vector resolution of the target codec unit meets a preset motion vector resolution. The preset motion vector precision may be a resolution of ¼ pixel or a resolution of 1 pixel, or may be another resolution.

It should be noted that in some specific implementation processes, in a case that the motion vector resolution of the target codec unit meets the preset motion vector resolution, the inter-frame prediction method in this embodiment of this application is employed.

In an implementation, target information of the target codec unit meets a preset threshold, and the target information includes at least one of an area, a width, and a height.

In an implementation, the method further includes:
  determining at least one of the preset direction, the first preset offset distance, and the second preset offset distance according to a value of a flag of a to-be-decoded image header.

It should be noted that in some specific implementation processes, in a case that a width and/or a height of the target codec unit meet/meets a preset threshold, the inter-frame prediction method in this embodiment of this application is implemented.

The inter-frame prediction method provided in the embodiments of this application may be performed by an inter-frame prediction apparatus. In the embodiments of this application, an example in which the inter-frame prediction apparatus performs the inter-frame prediction method is used to describe the inter-frame prediction apparatus provided in the embodiments of this application.

Figure 3:
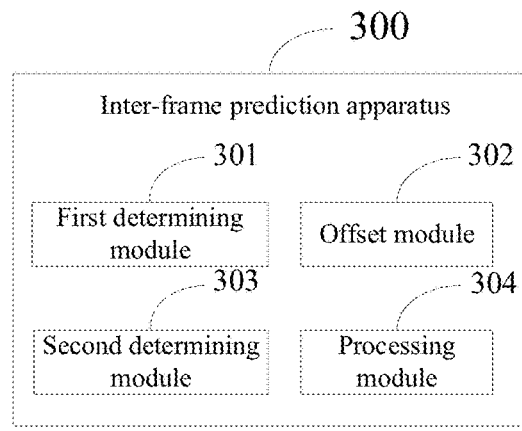
FIG. 3 is a block diagram of an inter-frame prediction apparatus according to an embodiment of this application.

Referring to FIG. 3, an embodiment of this application provides an inter-frame prediction apparatus 300, including:
  a first determining module 301, configured to determine a plurality of motion vector prediction candidates from a motion vector prediction candidate list of a target codec unit according to a template;
  an offset module 302, configured to perform offset processing on the plurality of motion vector prediction candidates to obtain a plurality of offset motion vector prediction candidates;
  a second determining module 303, configured to determine a target motion vector prediction candidate according to the plurality of offset motion vector prediction candidates; and
  a processing module 304, configured to use the target motion vector prediction candidate as a search start point to obtain a target motion vector prediction through template matching, where
  the plurality of motion vector prediction candidates are a plurality of motion vector prediction candidates whose error between a current template and a reference template in the motion vector prediction candidate list is ranked in a first preset position.

In an implementation, the first preset position is N positions with a minimum error between the current template and the reference template in the motion vector prediction candidate list, where N is an integer greater than or equal to 1.

In an implementation, the offset module is specifically configured to:
perform offset processing on each of the plurality of motion vector prediction candidates along each of at least one preset direction according to a first preset offset distance, to obtain a plurality of first offset motion vector prediction candidates; and
the second determining module is specifically configured to:
determine the target motion vector prediction candidate from the plurality of first offset motion vector prediction candidates; or
determine the target motion vector prediction candidate from the plurality of first offset motion vector prediction candidates and the plurality of motion vector prediction candidates.

In an implementation, the second determining module is specifically configured to:
determine a first motion vector prediction candidate according to the plurality of first offset motion vector prediction candidates, where the first motion vector prediction candidate is a motion vector prediction candidate corresponding to a first offset motion vector prediction candidate whose error between the current template and the reference template is ranked in a second preset position;
perform offset processing on the first motion vector prediction candidate along each of the at least one preset direction according to a second preset offset distance, to obtain a second offset motion vector prediction candidate; and
determine, from the second offset motion vector prediction candidate, the target motion vector prediction candidate whose error between the current template and the reference template is ranked in a third preset position; or determine, from the second offset motion vector prediction candidate and the first motion vector prediction candidate, the target motion vector prediction candidate whose error between the current template and the reference template is ranked in a third preset position.

In an implementation, the first preset offset distance is less than a first threshold, and the second preset offset distance is greater than or equal to the first threshold.

In an implementation, the first preset offset distance is an offset distance included in a preset prediction offset distance set, the second preset offset distance is at least one offset distance associated with a target offset distance, and the target offset distance is a first preset offset distance corresponding to the first motion vector prediction candidate.

In an implementation, an error corresponding to the first offset motion vector prediction candidate is less than an error corresponding to the first motion vector prediction candidate.

In an implementation, the second determining module is specifically configured to:
determine, from the plurality of first offset motion vector prediction candidates and the plurality of motion vector prediction candidates, the target motion vector prediction candidate whose error between the current template and the reference template is ranked in a fourth preset position.

In an implementation, a motion vector resolution of each of the plurality of offset motion vector prediction candidates is equal to a motion vector resolution of the target codec unit.

In an implementation, a motion vector resolution of the target codec unit meets a preset motion vector resolution.

In an implementation, target information of the target codec unit meets a preset threshold, and the target information includes at least one of an area, a width, and a height.

In some implementations, the apparatus further includes:
a third determining module, configured to determine at least one of the preset direction, the first preset offset distance, and the second preset offset distance according to a value of a flag of a to-be-decoded image header.

In the embodiments of this application, a plurality of motion vector prediction candidates whose error between a current template and a reference template is ranked in a preset position are selected from a motion vector prediction candidate list of a target codec unit based on a template; then offset processing and screening are performed on the plurality of motion vector prediction candidates to obtain an optimal target motion vector prediction candidate; and finally, a target motion vector prediction is obtained based on the target motion vector prediction candidate through template matching, so that a more accurate motion vector prediction can be obtained by using the method in the embodiments of this application.

The inter-frame prediction apparatus in this embodiment of this application may be an electronic device, for example, an electronic device with an operating system, or may be a component in the electronic device, for example, an integrated circuit or a chip. The electronic device may be a server, a network attached storage (Network Attached Storage, NAS), or the like. This is not specifically limited in this embodiment of this application.

The inter-frame prediction apparatus provided in this embodiment of this application can implement the processes implemented in the method embodiment in FIG. 2, and achieve a same technical effect. To avoid repetition, details are not described herein again.

Figure 4:
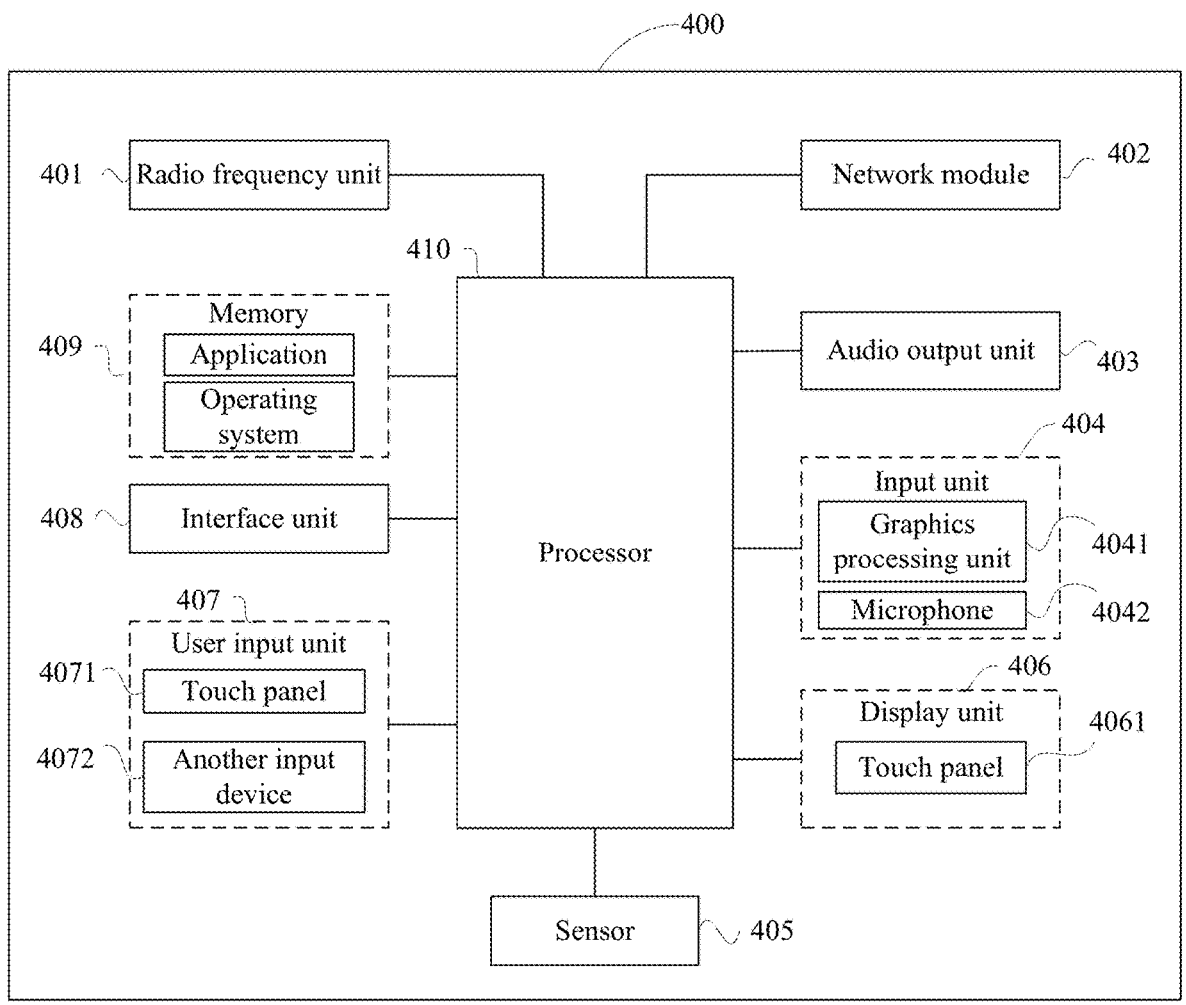
FIG. 4 is a block diagram of a terminal according to an embodiment of this application.

In some implementations, FIG. 4 is a schematic diagram of a hardware structure of a terminal according to an embodiment of this application.

A terminal 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

A person skilled in the art can understand that the terminal 400 may further include the power supply (for example, a battery) that supplies power to each component. The power supply may be logically connected to the processor 410 by using a power supply management system, so as to manage functions such as charging, discharging, and power consumption by using the power supply management system. The terminal structure shown in FIG. 4 constitutes no limitation on the terminal, and the terminal may include more or fewer components than those shown in the figure, or combine some components, or have different component arrangements. Details are not described herein.

It should be understood that, in this embodiment of this application, the input unit 404 may include a Graphics Processing Unit (GPU) 4041 and a microphone 4042, and the graphics processing unit 4041 processes image data of a still image or a video that is obtained by an image capturing apparatus (for example, a camera) in a video capturing mode or an image capturing mode. The display unit 406 may include a display panel 4061. The display panel 4061 may be configured in a form such as a liquid crystal display or an organic light-emitting diode. The user input unit 407 includes at least one of a touch panel 4071 and another input device 4072. The touch panel 4071 is also referred to as a touchscreen. The touch panel 4071 may include two parts: a touch detection apparatus and a touch controller. The another input device 4072 may include but is not limited to a physical keyboard, a functional button (such as a volume control button or a power on/off button), a trackball, a mouse, and a joystick. Details are not described herein.

In this embodiment of this application, after receiving downlink data from a network side device, the radio frequency unit 401 may transmit the downlink data to the processor 410 for processing. In addition, the radio frequency unit 401 may send uplink data to the network side device. Usually, the radio frequency unit 401 includes but is not limited to an antenna, an amplifier, a transceiver, a coupler, a low noise amplifier, a duplexer, and the like.

The memory 409 may be configured to store a software program or an instruction and various data. The memory 409 may mainly include a first storage area for storing a program or an instruction and a second storage area for storing data. The first storage area may store an operating system, and an application or an instruction required by at least one function (for example, a sound playing function or an image playing function). In addition, the memory 409 may be a volatile memory or a non-volatile memory, or the memory 409 may include a volatile memory and a non-volatile memory. The nonvolatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), a Static RAM (SRAM), a Dynamic RAM (DRAM), a Synchronous DRAM (SDRAM), a Double Data Rate SDRAM (DDRSDRAM), an Enhanced SDRAM (ES-DRAM), a Synch Link DRAM (SLDRAM), and a Direct Rambus RAM (DRRAM). The memory 409 in this embodiment of this application includes but is not limited to these memories and a memory of any other proper type.

The processor 410 may include one or more processing units. In some implementations, an application processor and a modem processor are integrated into the processor 410. The application processor mainly processes an operating system, a user interface, an application, and the like. The modem processor mainly processes a wireless communication signal, for example, a baseband processor. It can be understood that, alternatively, the modem processor may not be integrated into the processor 410.

The processor 410 is configured to determine a plurality of motion vector prediction candidates from a motion vector prediction candidate list of a target codec unit according to a template.

The processor 410 is configured to perform offset processing on the plurality of motion vector prediction candidates to obtain a plurality of offset motion vector prediction candidates.

The processor 410 is configured to determine a target motion vector prediction candidate according to the plurality of offset motion vector prediction candidates.

The processor 410 is configured to use the target motion vector prediction candidate as a search start point to obtain a target motion vector prediction through template matching.

The plurality of motion vector prediction candidates are a plurality of motion vector prediction candidates whose error between a current template and a reference template in the motion vector prediction candidate list is ranked in a first preset position.

In an implementation, the first preset position is N positions with a minimum error between the current template and the reference template in the motion vector prediction candidate list, where N is an integer greater than or equal to 1.

In an implementation, the processor 410 is configured to:
perform offset processing on each of the plurality of motion vector prediction candidates along each of at least one preset direction according to a first preset offset distance, to obtain a plurality of first offset motion vector prediction candidates; and
the processor 410 is specifically configured to:
determine the target motion vector prediction candidate from the plurality of first offset motion vector prediction candidates; or
determine the target motion vector prediction candidate from the plurality of first offset motion vector prediction candidates and the plurality of motion vector prediction candidates.

In an implementation, the processor 410 is configured to:
determine a first motion vector prediction candidate according to the plurality of first offset motion vector prediction candidates, where the first motion vector prediction candidate is a motion vector prediction candidate corresponding to a first offset motion vector prediction candidate whose error between the current template and the reference template is ranked in a second preset position;
perform offset processing on the first motion vector prediction candidate along each of the at least one preset direction according to a second preset offset distance, to obtain a second offset motion vector prediction candidate; and
determine, from the second offset motion vector prediction candidate, the target motion vector prediction candidate whose error between the current template and the reference template is ranked in a third preset position; or determine, from the second offset motion vector prediction candidate and the first motion vector prediction candidate, the target motion vector prediction candidate whose error between the current template and the reference template is ranked in a third preset position.

In an implementation, the first preset offset distance is less than a first threshold, and the second preset offset distance is greater than or equal to the first threshold.

In an implementation, the first preset offset distance is an offset distance included in a preset prediction offset distance set, the second preset offset distance is at least one offset distance associated with a target offset distance, and the target offset distance is a first preset offset distance corresponding to the first motion vector prediction candidate.

In an implementation, an error corresponding to the first offset motion vector prediction candidate is less than an error corresponding to the first motion vector prediction candidate.

In an implementation, the processor 410 is configured to:
determine, from the plurality of first offset motion vector prediction candidates and the plurality of motion vector prediction candidates, the target motion vector prediction candidate whose error between the current template and the reference template is ranked in a fourth preset position.

In an implementation, a motion vector resolution of each of the plurality of offset motion vector prediction candidates is equal to a motion vector resolution of the target codec unit.

In an implementation, a motion vector resolution of the target codec unit meets a preset motion vector resolution.

In an implementation, target information of the target codec unit meets a preset threshold, and the target information includes at least one of an area, a width, and a height.

In an implementation, the processor 410 is configured to determine at least one of the preset direction, the first preset offset distance, and the second preset offset distance according to a value of a flag of a to-be-decoded image header.

In the embodiments of this application, a plurality of motion vector prediction candidates whose error between a current template and a reference template is ranked in a preset position are selected from a motion vector prediction candidate list of a target codec unit based on a template; then offset processing and screening are performed on the plurality of motion vector prediction candidates to obtain an optimal target motion vector prediction candidate; and finally, a target motion vector prediction is obtained based on the target motion vector prediction candidate through template matching, so that a more accurate motion vector prediction can be obtained by using the method in the embodiments of this application.

An embodiment of this application further provides a readable storage medium. The readable storage medium stores a program or an instruction, and the program or the instruction is executed by a processor to implement the processes of the foregoing method embodiment, and a same technical effect can be achieved. To avoid repetition, details are not described herein again.

The processor is a processor in the terminal in the foregoing embodiment. The readable storage medium includes a computer readable storage medium, such as a computer ROM, a RAM, a magnetic disk, or an optical disc.

An embodiment of this application further provides a chip. The chip includes a processor and a communication interface, the communication interface is coupled to the processor, and the processor is configured to run a program or an instruction to implement the processes of the foregoing inter-frame prediction method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

An embodiment of this application further provides a computer program/program product. The computer program/program product is stored in a storage medium, and the program/program product is executed by at least one processor to implement the processes of the foregoing inter-frame prediction method embodiment, and a same technical effect can be achieved. To avoid repetition, details are not described herein again.

It should be noted that, in this specification, the terms "include," "comprise," or their any other variant are intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the foregoing descriptions of the embodiments, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (for example, a ROM/RAM, a floppy disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are merely illustrative but not restrictive. Under the enlightenment of this application, a person of ordinary skill in the art can make many forms without departing from the purpose of this application and the protection scope of the claims, all of which fall within the protection of this application.

The invention claimed is:

1. An inter-frame prediction method, comprising:
    determining a plurality of motion vector prediction candidates from a motion vector prediction candidate list of a target codec unit according to a template;
    performing offset processing on each of the plurality of motion vector prediction candidates along each of at least one preset direction according to a first preset offset distance, to obtain a plurality of offset motion vector prediction candidates;
    determining a target motion vector prediction candidate from:
        the plurality of first offset motion vector prediction candidates; or
        the plurality of first offset motion vector prediction candidates and the plurality of motion vector prediction candidates; and
    using the target motion vector prediction candidate as a search start point to obtain a target motion vector prediction through template matching,
    wherein the plurality of motion vector prediction candidates are a plurality of motion vector prediction candidates whose error between a current template and a reference template in the motion vector prediction candidate list is ranked in a first preset position.

2. The inter-frame prediction method according to claim 1, wherein the first preset position is N positions with a minimum error between the current template and the reference template in the motion vector prediction candidate list, wherein N is an integer greater than or equal to 1.

3. The inter-frame prediction method according to claim 1, wherein the determining the target motion vector prediction candidate from the plurality of first offset motion vector prediction candidates comprises:
  determining a first motion vector prediction candidate according to the plurality of first offset motion vector prediction candidates, wherein the first motion vector prediction candidate is a motion vector prediction candidate corresponding to a first offset motion vector prediction candidate whose error between the current template and the reference template is ranked in a second preset position;
  performing offset processing on the first motion vector prediction candidate along each of the at least one preset direction according to a second preset offset distance, to obtain a second offset motion vector prediction candidate; and
  determining, from the second offset motion vector prediction candidate, the target motion vector prediction candidate whose error between the current template and the reference template is ranked in a third preset position; or determining, from the second offset motion vector prediction candidate and the first motion vector prediction candidate, the target motion vector prediction candidate whose error between the current template and the reference template is ranked in a third preset position.

4. The inter-frame prediction method according to claim 3, wherein the first preset offset distance is less than a first threshold, and the second preset offset distance is greater than or equal to the first threshold.

5. The inter-frame prediction method according to claim 3, wherein the first preset offset distance is an offset distance comprised in a preset prediction offset distance set, the second preset offset distance is at least one offset distance associated with a target offset distance, and the target offset distance is a first preset offset distance corresponding to the first motion vector prediction candidate.

6. The inter-frame prediction method according to claim 3, wherein an error corresponding to the first offset motion vector prediction candidate is less than an error corresponding to the first motion vector prediction candidate.

7. The inter-frame prediction method according to claim 1, wherein the determining the target motion vector prediction candidate from the plurality of first offset motion vector prediction candidates and the plurality of motion vector prediction candidates comprises:
  determining, from the plurality of first offset motion vector prediction candidates and the plurality of motion vector prediction candidates, the target motion vector prediction candidate whose error between the current template and the reference template is ranked in a fourth preset position.

8. The inter-frame prediction method according to claim 1, wherein a motion vector resolution of each of the plurality of offset motion vector prediction candidates is equal to a motion vector resolution of the target codec unit.

9. The inter-frame prediction method according to claim 1, wherein a motion vector resolution of the target codec unit meets a preset motion vector resolution.

10. The inter-frame prediction method according to claim 1, wherein target information of the target codec unit meets a preset threshold, and the target information comprises at least one of an area, a width, or a height.

11. The inter-frame prediction method according to claim 3, further comprising:
  determining at least one of the preset direction, the first preset offset distance, or the second preset offset distance according to a value of a flag of a to-be-decoded image header.

12. A terminal, comprising:
  a memory storing computer-readable instructions; and
  a processor coupled to the memory, wherein the computer-readable instructions, when executed by the processor, cause the processor to perform operations comprising:
  determining a plurality of motion vector prediction candidates from a motion vector prediction candidate list of a target codec unit according to a template;
  performing offset processing on each of the plurality of motion vector prediction candidates along each of at least preset direction according to a first preset offset distance, to obtain a plurality of offset motion vector prediction candidates;
  determining a target motion vector prediction candidate from:
    the plurality of first offset motion vector prediction candidates; or
    the plurality of first offset motion vector prediction candidates and the plurality of motion vector prediction candidates; and
  using the target motion vector prediction candidate as a search start point to obtain a target motion vector prediction through template matching,
  wherein the plurality of motion vector prediction candidates are a plurality of motion vector prediction candidates whose error between a current template and a reference template in the motion vector prediction candidate list is ranked in a first preset position.

13. The terminal according to claim 12, wherein the first preset position is N positions with a minimum error between the current template and the reference template in the motion vector prediction candidate list, wherein N is an integer greater than or equal to 1.

14. The terminal according to claim 12, wherein the determining the target motion vector prediction candidate from the plurality of first offset motion vector prediction candidates comprises:
  determining a first motion vector prediction candidate according to the plurality of first offset motion vector prediction candidates, wherein the first motion vector prediction candidate is a motion vector prediction candidate corresponding to a first offset motion vector prediction candidate whose error between the current template and the reference template is ranked in a second preset position;
  performing offset processing on the first motion vector prediction candidate along each of the at least one preset direction according to a second preset offset distance, to obtain a second offset motion vector prediction candidate; and
  determining, from the second offset motion vector prediction candidate, the target motion vector prediction candidate whose error between the current template and the reference template is ranked in a third preset position; or determining, from the second offset motion vector prediction candidate and the first motion vector prediction candidate, the target motion vector prediction candidate whose error between the current template and the reference template is ranked in a third preset position.

15. The terminal according to claim 14, wherein the first preset offset distance is less than a first threshold, and the second preset offset distance is greater than or equal to the first threshold.

16. The terminal according to claim 14, wherein the first preset offset distance is an offset distance comprised in a preset prediction offset distance set, the second preset offset distance is at least one offset distance associated with a target offset distance, and the target offset distance is a first preset offset distance corresponding to the first motion vector prediction candidate.

17. The terminal according to claim 14, wherein an error corresponding to the first offset motion vector prediction candidate is less than an error corresponding to the first motion vector prediction candidate.

18. A non-transitory computer-readable medium storing instructions that, when executed by a processor, cause the processor to perform operations comprising:
  determining a plurality of motion vector prediction candidates from a motion vector prediction candidate list of a target codec unit according to a template;
  performing offset processing on each of the plurality of motion vector prediction candidates along each of at least preset direction according to a first preset offset distance, to obtain a plurality of offset motion vector prediction candidates;
  determining a target motion vector prediction candidate from:
    the plurality of first offset motion vector prediction candidates; or
    the plurality of first offset motion vector prediction candidates and the plurality of motion vector prediction candidates; and
  using the target motion vector prediction candidate as a search start point to obtain a target motion vector prediction through template matching,
  wherein the plurality of motion vector prediction candidates are a plurality of motion vector prediction candidates whose error between a current template and a reference template in the motion vector prediction candidate list is ranked in a first preset position.

* * * * *